United States Patent [19]
Quick

[11] 3,952,482
[45] Apr. 27, 1976

[54] BUTT LIFTING ROLLER FOR SUGAR CANE HARVESTERS

[75] Inventor: Donald Jonathon Quick, Bundaberg, Australia

[73] Assignee: Massey-Ferguson Services N.V., Curacao, Netherlands Antilles

[22] Filed: Oct. 4, 1974

[21] Appl. No.: 512,274

[30] Foreign Application Priority Data
Oct. 13, 1973    United Kingdom............... 47911/73

[52] U.S. Cl.................................... 56/13.9; 56/14.3; 56/249; 198/211
[51] Int. Cl.².......................................... A01D 45/10
[58] Field of Search.................. 56/14.3, 13.9, 13.4, 56/503, 13.5–13.8, 14.4; 198/211

[56] References Cited
UNITED STATES PATENTS

| | | |
|---|---|---|
| 2,528,116 | 10/1950 | Clemson ............................... 56/249 |
| 2,696,696 | 11/1954 | Tigerman ............................... 56/249 |
| 3,599,404 | 8/1971 | Fernandez et al. .................. 56/14.3 |
| 3,673,774 | 7/1972 | Mizzi ..................................... 56/13.9 |
| 3,750,865 | 8/1973 | Harrell ................................. 198/211 |

FOREIGN PATENTS OR APPLICATIONS 1,314,150   11/1962   France ................................. 56/249

Primary Examiner—Russell R. Kinsey
Attorney, Agent, or Firm—Robert L. Farris

[57]    ABSTRACT

Butt lifter roller for lifting the butts of sugar cane sticks immediately after severing by the base cutter in a sugar cane harvester. The roller has V-shaped grooves of varying width extending round its periphery. Cane butts at least partially enter the grooves and are pinched or gripped therein and lifted over the roller by rotation thereof.

4 Claims, 17 Drawing Figures

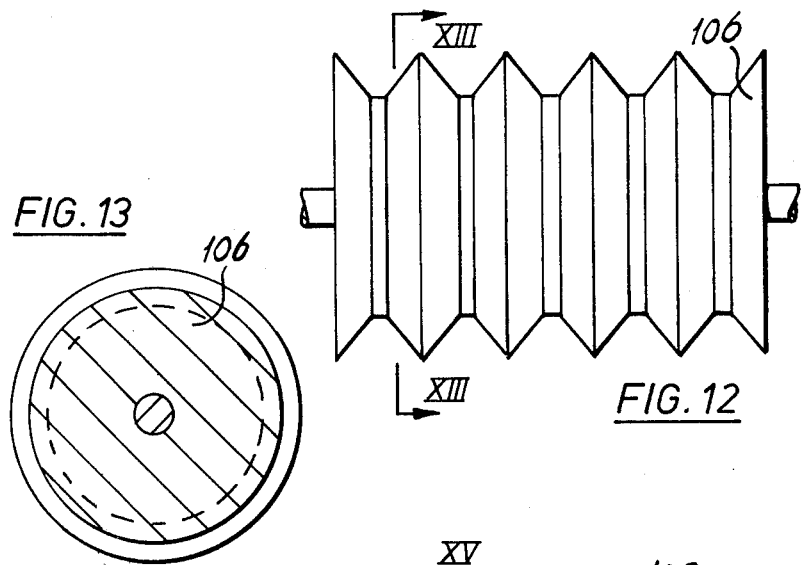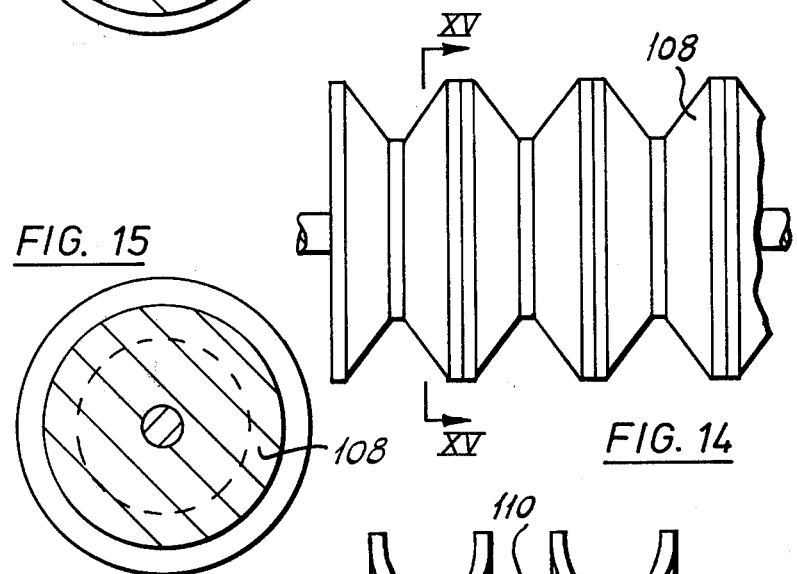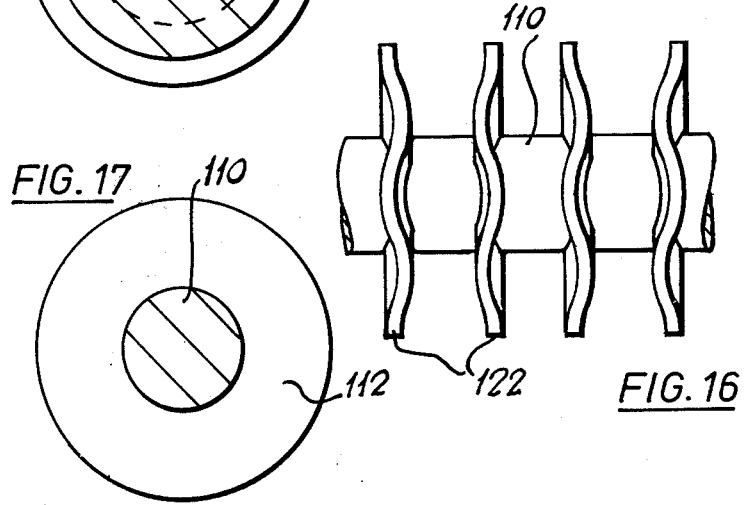

BUTT LIFTING ROLLER FOR SUGAR CANE HARVESTERS

This invention relates to sugar cane harvesters and in particular to cane feeding apparatus in sugar cane harvesters.

In sugar cane harvesters, it is usual practice to provide base cutting means for severing canes from their roots, and cane feeding apparatus to convey the severed canes to apparatus for treating or handling the cane prior to its deposition in a wagon for transportation to a sugar extraction mill.

The cane feeding apparatus usually includes a butt lifter roller operative to direct severed canes upwards and rearwards. However we have ascertained that this butt lifter roller as constructed and arranged in several previously proposed cane harvesters gives rises to such disadvantages as assisting the feeding of rocks and soil into the harvester from the base cutting means with the cane or else it interferes with the smooth flow of cane into the harvester and thereby impairs the efficiency of the machine.

An object of the present invention is to provide improved cane feeding apparatus for a sugar cane harvester.

According to the invention there is provided a sugar cane harvester comprising base cutting means capable of severing canes from their roots, a rotatable feed member positioned adjacent the base cutting means to intercept canes severed by the base cutting means, and drive means capable of rotating the feed member characterized in that the feed member is formed with ridges defining grooves extending around its axis of rotation, the dimensions of each groove being such that the end of a cane stick can at least partially enter therein.

Embodiments of the invention will now be described by way of example with reference to the accompanying drawings in which:

FIGS. 12, 14 and 16 show in side elevation portions of three further forms of cane feed member;

FIGS. 13 and 15 show sections through the cane feed members of FIGS. 12 and 14, on the lines XIII-XIII and XV-XV respectively therein; and FIG. 17 shows an end view of the cane feed member of FIG. 16.

Figure 1:
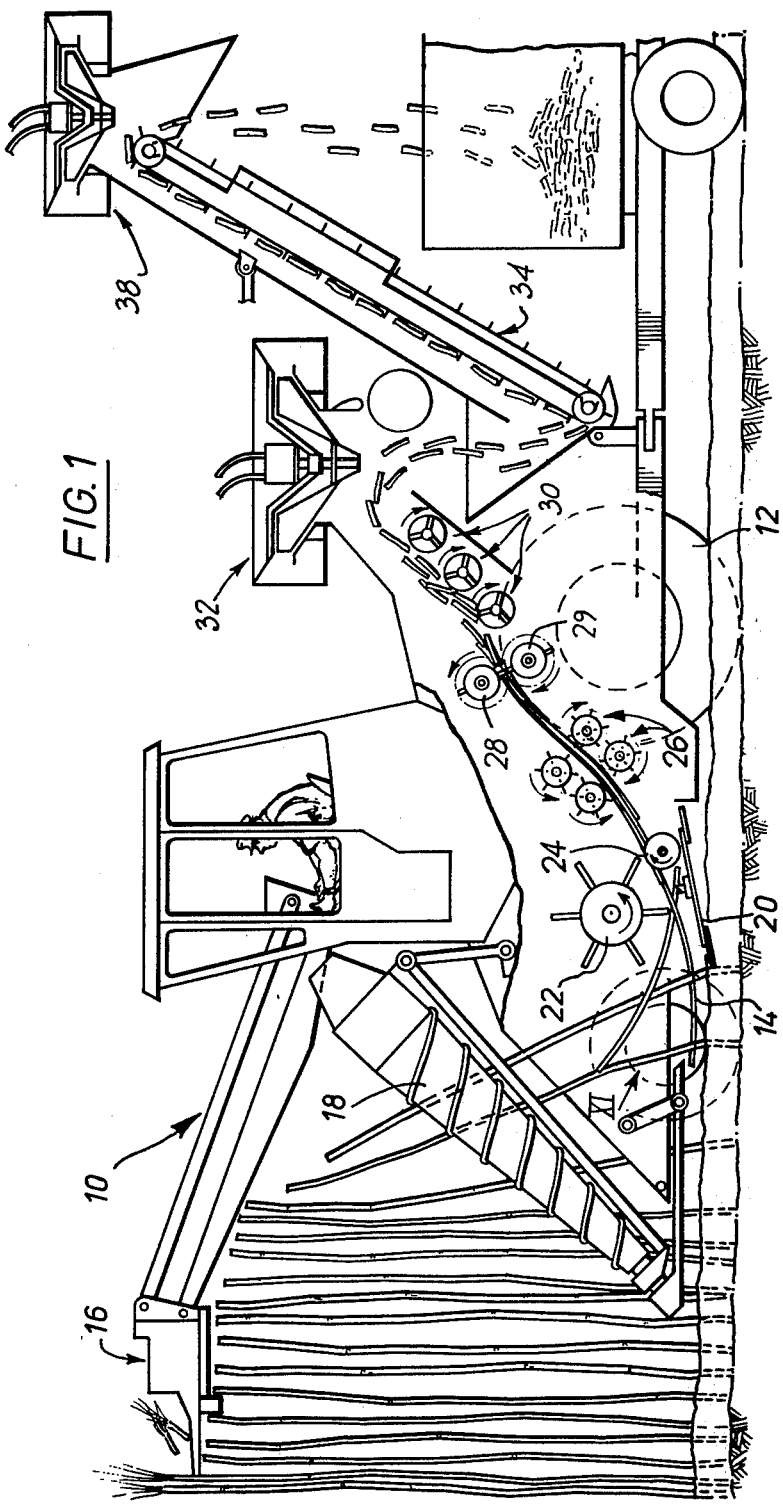
FIG. 1 shows a sugar cane harvester in side elevation and partly cut-away to reveal details of its cane treatment apparatus.

Referring to FIG. 1, a sugar cane harvester 10 comprises power driven rear traction wheels 12, forward steerable wheels 14, a top cutting unit 16 and rotatable crop lifters 18.

Base cutting means 20 severs the canes from their roots and they are fed into the harvester by cane feeding apparatus comprising large paddle roller 22 rotary feed member 24 and two pairs of feeding and cleaning rollers 26. Further crop treatment and handling apparatus comprises cane chopper drums 28, 29, flipper rollers 30, trash extraction apparatus 32, elevator 34 and trash extraction apparatus 38.

Figure 2:
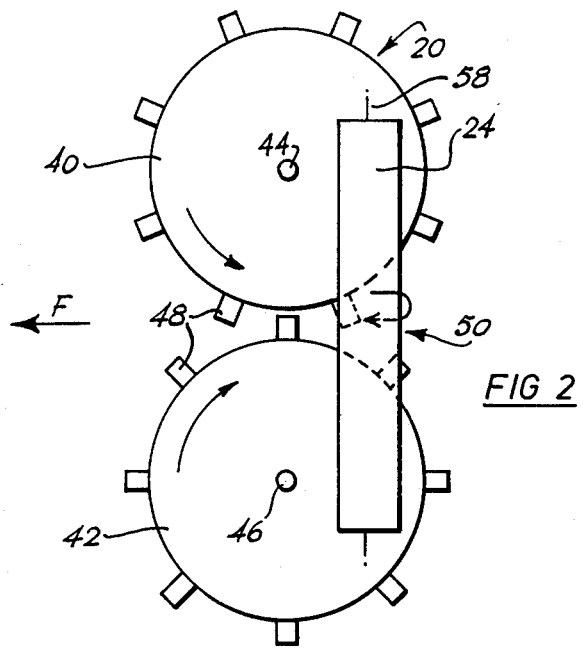
FIG. 2 is a diagrammatic plan view of base cutters and a cane feed member in the harvester of FIG. 1.

Referring now to FIG. 2, base cutting means 20 comprises a pair of cutter-carrying discs 40, 42 mounted for rotation about respective axes 44, 46. Eight cutter blades 48 are mounted at the periphery of each of the discs 40, 42.

Rotary feed member 24 is in the form of a roller mounted just above the discs 40, 42 and extending transverse to the direction F of normal forward movement of the harvester. The position of the member 24 is such that it lies directly over the generally triangular gap 50 behind the discs which is defined by and lies between the circles described by the cutters 48.

Figure 3:
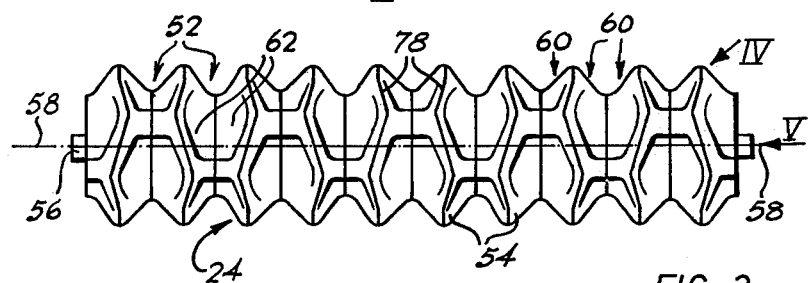
FIG. 3 is a plan view of the cane feed member of FIG. 2 showing the structure of the feed member in more detail.
Figure 4:
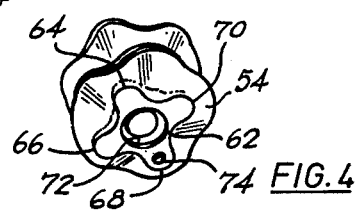
FIG. 4 shows a perspective view of a portion of the cane feed member of FIG. 3 as viewed in the direction of arrow IV therein.
Figure 5:
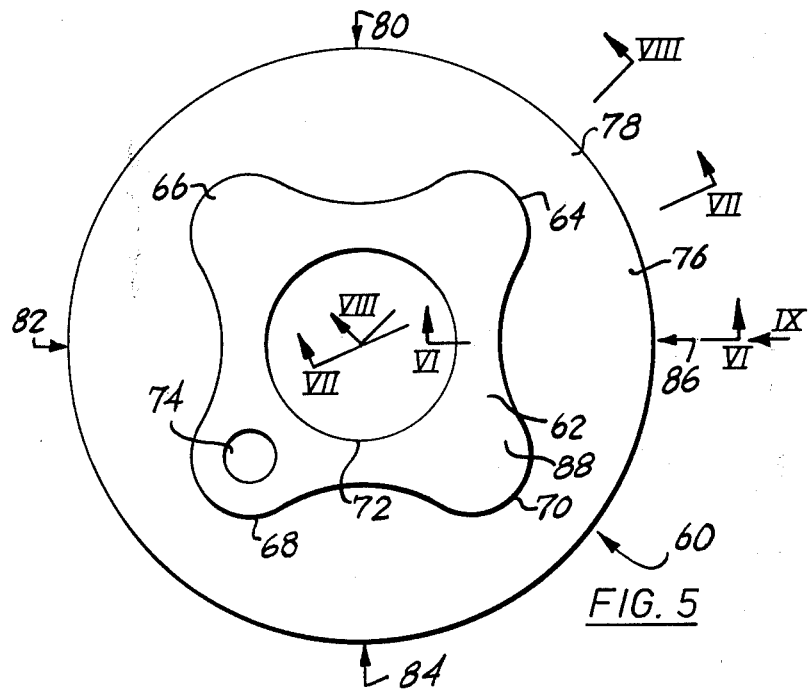
FIG. 5 shows one end elevation of an element of the feed member.
Figure 10:
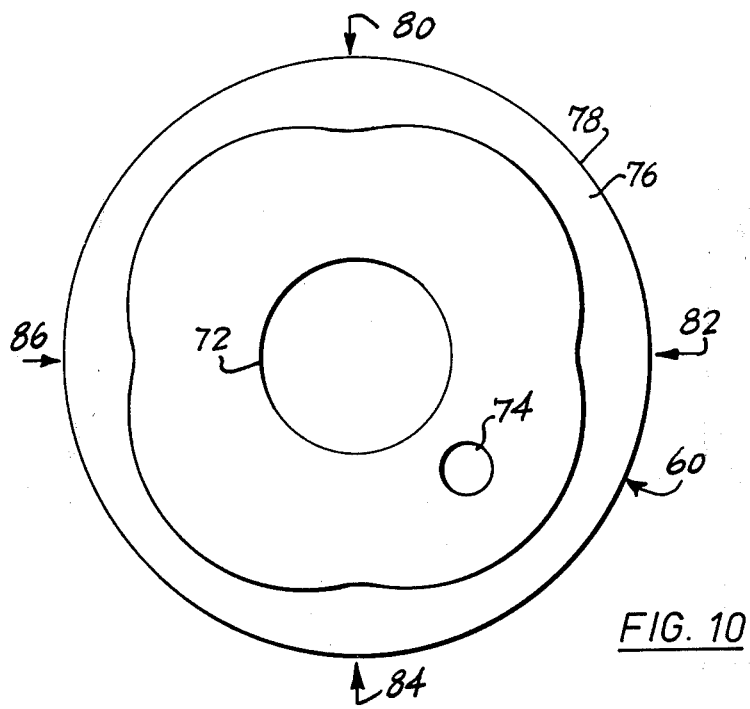
FIG. 10 shows the other end elevation of the element of the cane feed member of FIG. 3 i.e. as viewed in the direction of arrow X in FIG. 9.
Figure 6:
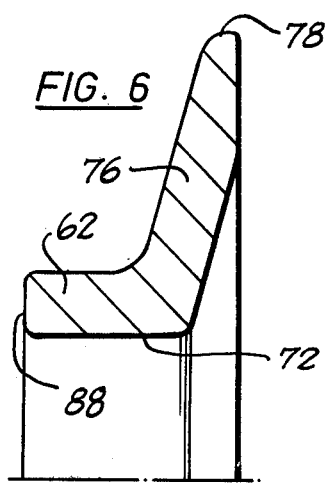
FIGS. 6, 7 and 8 show sections through the element of FIG. 5 along the lines VI—VI, VII—VII and VIII—VIII respectively in FIG. 5.
Figure 7:
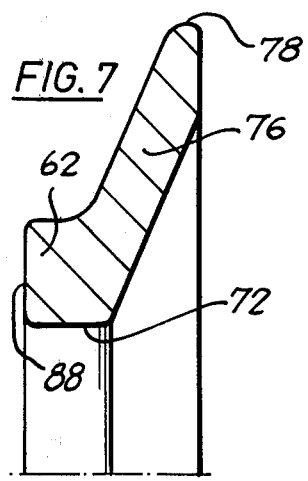
Figure 8:
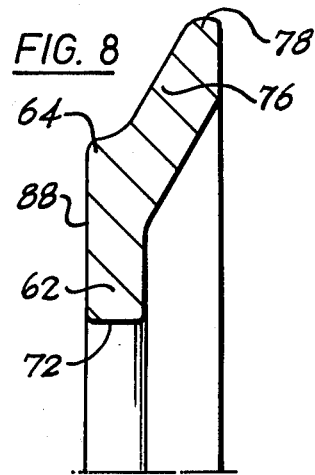
Figure 9:
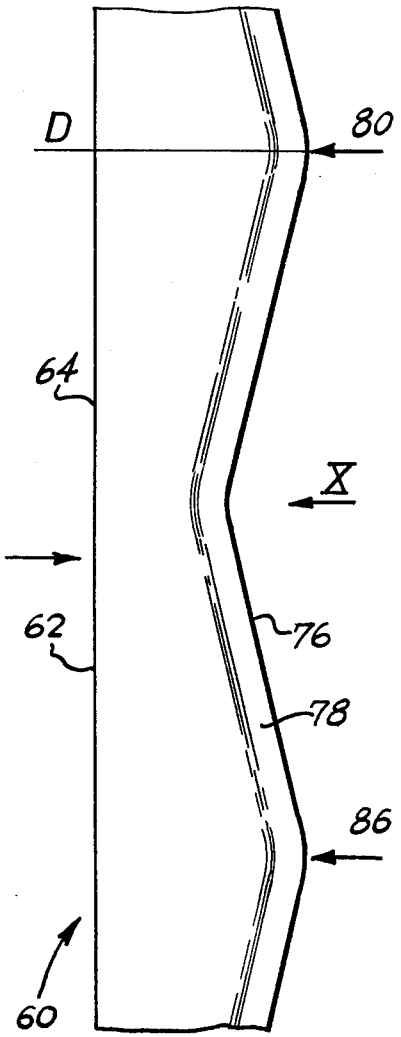
FIG. 9 shows a developed side view of the element of FIG. 5 i.e. the element as seen in the direction of arrow IX in FIG. 5.

As shown in FIG. 3, roller 24 has a series of annular grooves 52 formed therein. Each groove is generally V-shaped as seen in section and the grooves are defined by a series of spaced ridges 54. The roller is mounted on a shaft 56 supported in bearings (not shown) and connected to drive means (not shown) to rotate the roller about an axis 58.

Roller 24 is made up of a modular assembly of identical cast iron roller elements 60 arranged in back-to-back pairs on shaft 56. The structure of each roller element is shown in FIGS. 4 to 10.

Each roller element 60 comprises a hub 62 having four lobes 64, 66, 68, 70 and formed with a central bore 72 to receive shaft 56. An offset bore 74 is formed in lobe 68 to receive a shaft (not shown) whereby the roller elements are driven and held in predetermined angular relationship relative to each other.

Hub 62 is formed integrally with an outwardly projecting flange 76. The flange has a circular periphery 78 and undulates in the axial direction as shown in FIGS. 6 to 9. The limit of the undulations in one direction are at each of the lobes 64, 66, 68, 70. The limit of the undulations in the other direction are at the mid points between the lobes i.e. at the positions indicated by the reference numerals 80, 82, 84 and 86.

The roller elements 60 are assembled on shaft 56 in pairs with flanges 76 nesting in back-to-back relationship, as seen in FIG. 3, to define the ridges 54. The hubs 62 of each pair of roller elements project in opposite directions and are each formed with a planor end face 88 for face to face contact with the hubs of adjacent roller elements.

The width and depth of each groove 52 in roller 24 as defined by flanges 76 varies from maxima at the positions 80, 82, 84 and 86 to minima at the lobes 64, 66, 68, 70. The lobes define bumps or undulations in the bottom or base of the groove. At the base of the groove, its width is 1⅝ inches at positions 80, 82, 84 and 86, and ⅝ inch at the lobes 64, 66, 68 and 70. At the top of each groove, its maximum width is 2½ inches at positions 80, 82, 84 and 86.

Clamping members (not shown) are provided at each end of roller 24 to prevent axial movement of the roller elements 60 relative to each other along shaft 56. The roller is driven in the direction indicated in FIGS. 1 and 2 by a sprocket (not shown) which drivably engages the shaft in bores 74.

In use, the butt ends of severed canes passing over base cutters 20 encounter roller 24, enter the grooves 52, and are pinched in the narrow portions of the grooves. Rotation of the roller carries the butts over the roller where the pinching action of the groove is automatically released and the cane is fed towards rollers 26.

Among the advantages provided by the above embodiment are:

1. smoother crop flow from the base cutters to the cane chopping apparatus;
2. less dirt is fed into the harvester with the cane — due to roller 24 being positioned above the base cutters and having no paddle elements;
3. no need for the provision of a sill plate in the triangular gap 50 between the base cutters — which eliminates the problems of mud build-up which are inherent in such a plate;
4. butt lifter roller 24 does not limit the lowering of the base cutters for cutting below the ground level because the roller is mounted above the base cutters.

Figure 11:
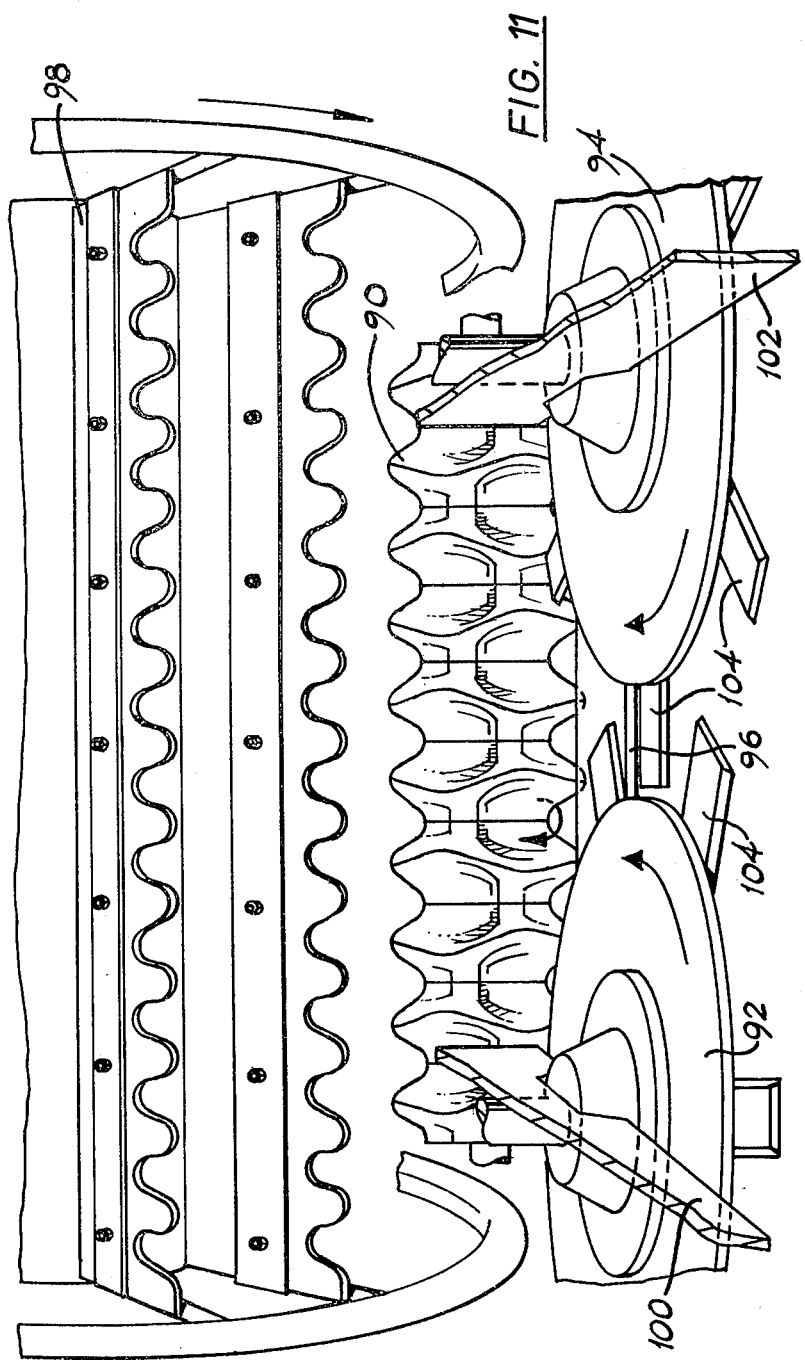
FIG. 11 shows a perspective view in the direction of arrow XI in FIG. 1 i.e. looking into the crop gathering throat of the harvester, but showing an alternative position of the feed member.

The embodiment of FIG. 11 is otherwise constructed in a manner substantially identical to that of the embodiment described above except that feed roller 90 (corresponding to roller 24) is mounted behind base cutters 92, 94 instead of above them. In consequence a sill plate 96 is provided between the base cutters to prevent the butts or ends of severed cane sticks tending to pass below roller 90, and becoming jammed.

Paddle roller 98 corresponds to roller 22 and assists in feeding the severed canes rearwards between the rearwardly converging vertical walls 100, 102 of the crop gathering throat of the harvester.

In use, cane sticks are severed from their roots by the blades 104 of base cutters 92, 94. The cane butts are fed onto plate 96, engage roller 90 are gripped by the grooves thereon and fed rearwards over the roller and into the harvester as described above.

In the embodiments of FIGS. 12 to 15 rollers 106 and 108 corresponding to rollers 24 and 90 of the previous embodiments each have circumferential V-shaped grooves therein of constant width. The larger grooves of roller 108 are for use with thicker cane. These embodiments provide less aggressive cane feeding action on account of the less pronounced pinching action of grooves — the pinching action arising only from the V-shape of the grooves.

In the embodiment of FIGS. 16 and 17, a central cylindrical shaft 110 has a series of corrugated disc washers 112 welded to it at spaced-apart positions. These washers define grooves which have parallel sides but which vary in axial width. In use, this embodiment functions in a manner similar to the embodiment of FIGS. 1 to 10.

In accordance with the invention, the dimensions and shape of the grooves formed in the rotatable feed member may be chosen according to crop conditions and crop size. The normal maximum width of a single cane stick likely to be encountered during harvesting is 2½ inches at the butt end of the stick. The usual minimum butt width at the time of harvesting is ¾ inch. The groove need not be large enough to allow the largest cane stick to be gripped on opposite sides of a diameter through the cane stick. It is sufficient if there is an appreciable pinching action on the cane butt. Indeed the basic requirement for the grooves in the roller is that some part of the groove is narrow enough to pinch the cane butts. However, it will be appreciated that the bumps at the bottom of the grooves 52 in the roller of FIGS. 1 to 10 produced by the lobes 64, 66, 68 and 70 also assist in lifting small canes over the roller. Less than four or more than four lobes could be used. This would affect the rate of rotation of the roller needed during use.

I claim:

1. A sugar cane harvester comprising base cutting means capable of severing canes from their roots, a rotatable feed member positioned adjacent the base cutting means to intercept canes severed by the base cutting means, and drive means capable of rotating the feed member, characterized in that the feed member includes spaced corrugated discs that form ridges which define grooves extending around its axis of rotation with a width that varies from place to place along the length of said grooves, the dimensions of each groove being such that the end of a cane stick can at least partially enter therein.

2. A sugar cane harvester comprising base cutting means capable of severing canes from their roots, a rotatable feed member positioned adjacent the base cutting means to intercept canes severed by the base cutting means, and drive means capable of rotating the feed member, characterized in that the feed member is formed with ridges of defining grooves extending around its axis of rotation with a width that varies from place to place along the width of said grooves, the dimensions of each groove being such that the end of a cane stick can at least partially enter therein and wherein the apex of each ridge follows a course which undulates in the axial direction along the length thereof.

3. A sugar cane harvester according to claim 2 characterized in that the base of each ridge follows a course which undulates in the axial direction along the length thereof.

4. A sugar cane harvester according to claim 3 characterized in that the undulations of the apex and of the base of any one ridge are of equal pitch and in phase with each other.

* * * * *

PO-1050
(5/69)

UNITED STATES PATENT OFFICE
CERTIFICATE OF CORRECTION

Patent No. 3,952,482              Dated April 27, 1976

Inventor(s)    Donald Jonathon Quick, Bundaberg, Australia

It is certified that error appears in the above-identified patent and that said Letters Patent are hereby corrected as shown below:

In claim 2 on line 9, cancel "width" and insert --length--.

Signed and Sealed this

Tenth Day of August 1976

[SEAL]

Attest:

RUTH C. MASON
*Attesting Officer*

C. MARSHALL DANN
*Commissioner of Patents and Trademarks*